United States Patent [19]
Chou et al.

[11] Patent Number: 5,619,026
[45] Date of Patent: Apr. 8, 1997

[54] GRAYSCALE BARCODE READING APPARATUS SYSTEM INCLUDING TRANSLATING DEVICE FOR TRANSLATING A PATTERN IMAGE INTO A SEQUENCE OF BAR WIDTHS AND TRANSITION DIRECTIONS

[75] Inventors: Paul B. Chou, Montvale, N.J.; Frederick Y. Wu, Cos Cob, Conn.; Danny C. Wong, Ringwood, N.J.

[73] Assignee: International Business Machines Corporation, Armonk, N.Y.

[21] Appl. No.: 368,187

[22] Filed: Jan. 4, 1995

[51] Int. Cl.⁶ ...................................................... G06K 7/10
[52] U.S. Cl. .......................................... 235/462; 235/465
[58] Field of Search ................................... 235/462, 494, 235/472, 463, 465

[56] References Cited

U.S. PATENT DOCUMENTS

| | | | |
|---|---|---|---|
| 4,158,435 | 6/1979 | Nakanishi et al. | 235/463 |
| 4,443,694 | 4/1984 | Sanford | 235/465 |
| 4,740,675 | 4/1988 | Brosnan et al. | 235/462 |
| 4,880,964 | 11/1989 | Donahue | 235/462 |
| 5,278,400 | 1/1994 | Appel | 235/494 |
| 5,326,961 | 7/1994 | Sibata | 235/463 |
| 5,468,946 | 11/1995 | Oliver | 235/462 |

OTHER PUBLICATIONS

Borrus et al.; "Will China Scuttle Its Pirates?"; Business Week, Aug. 15, 1994, pp. 40–41.
"Card Technology: Cards With Photo ID MAy Help in Fraud Fight"; American Banker, Apr. 20, 1994; 3 pages [abstract].

*Primary Examiner*—Donald T. Hajec
*Assistant Examiner*—Dong Q. Luong
*Attorney, Agent, or Firm*—Whitham, Curtis, Whitham & McGinn; Stephen C. Kaufman, Esq.

[57] ABSTRACT

A system for verifying an object of interest, includes a grayscale one-dimensional bar pattern coupled to the object, an illumination and imaging system using a one-dimensional imaging device for reading the pattern coupled to the object and for producing a pattern image, a device for translating the pattern image into a sequence of bar widths and transition directions representing a detected code, a device for comparing the detected code with a predetermined code, and a device for indicating one of the detected code and acceptance or rejection of the detected code based on comparison of the detected code with the predetermined code.

20 Claims, 3 Drawing Sheets

GRAYSCALE BARCODE READING APPARATUS SYSTEM INCLUDING TRANSLATING DEVICE FOR TRANSLATING A PATTERN IMAGE INTO A SEQUENCE OF BAR WIDTHS AND TRANSITION DIRECTIONS

BACKGROUND OF THE INVENTION

1. Field of the Invention

The present invention generally relates to a pattern recognition system and more particularly to a pattern recognition system for use in defeating counterfeiting.

2. Description of the Related Art

Spatial patterns, such as logos or white-light holograms are commonly used for authentication and security. Ideally, these patterns are difficult to copy, but are easy to recognize or verify.

Alternative security devices that are conventionally used are magnetic stripes and white-light holograms. Magnetic stripes offer little security because equipment that reads, laminates, and encodes the magnetic is readily available to the public at low cost. Thus, the opportunity for counterfeiting is great. White-light holograms have decreased security because counterfeiting is becoming commonplace, and humans cannot easily detect fakes.

More specifically, spatial patterns are commonly used to show the authenticity of name-brand products, credit cards, etc. The complexity or difficulty of unauthorized reproduction of such patterns is a deterrent to counterfeiting or the like by unauthorized licensees. However, counterfeiting of difficult patterns such as white-light holograms is quickly reaching a state in which non-expert humans cannot adequately and reliably distinguish between a "fake" and the original product. This problem in human verification has created a need for machine-automated verification.

One aspect of making a pattern difficult to copy is to make the pattern difficult to discover or to obscure the pattern. For example, a laser (e.g., non white-light) hologram can be seen only under specific illumination and imaging conditions. This obscuration feature further deters or delays successful counterfeiting. Currently, there are efforts underway in the bar code industry to place hidden bar codes in holograms for this purpose. A major advantage of bar codes is the large infrastructure of the bar code industry, which may allow standard codes and readers to be used with little modification and at low cost.

However, while a hidden pattern, such as a laser hologram, makes counterfeiting difficult, the hidden pattern may make verification difficult, as mentioned above. A machine verification system that sets up the proper imaging conditions and automatically verifies the pattern is needed. Machine verification also would reduce subjectivity and increase reliability, not presently available with human verification.

However, once a counterfeiter discovers how to observe the hidden bar code by experiment or reverse engineering of an automatic verifier, the counterfeiter can easily read and reproduce the bar code. Thus, for machine verification, it also is desirable to have a simple but non-obvious algorithm so that reverse engineering the pattern and verification method is unfeasible to the unscrupulous counterfeiter.

Hitherto the invention, no such structure incorporating such an algorithm and scheme was available and there has been no exploitation of the value of using hidden patterns through the use of simple but non-obvious, non-standard patterns and verification algorithms.

SUMMARY OF THE INVENTION

It is therefore an object of the present invention to provide a simple but non-obvious algorithm so that reverse engineering the pattern and verification method is unfeasible.

Another object of the present invention is to exploit the value of using hidden patterns through the use of simple but non-obvious, non-standard patterns and verification algorithms.

Yet another object of the present invention is to provide a structure for exploiting hidden patterns by using simple but non-obvious, non-standard patterns and verification algorithms.

In a first aspect of the present invention, a system for verifying an object of interest, is provided which includes a grayscale one-dimensional bar pattern coupled to the object, an illumination and imaging system using a one-dimensional imaging device for reading the pattern coupled to the object and for producing a pattern image, a device for translating the pattern image into a sequence of bar widths and transition directions representing a detected code, a device for comparing the detected code with a predetermined code, and a device for indicating one of the detected code and acceptance or rejection of the detected code based on comparison of the detected code with the predetermined code.

In a second aspect of the invention, an apparatus is provided for verifying an object of interest having a grayscale one-dimensional bar pattern coupled thereto. The apparatus includes an illumination and imaging system using a one-dimensional imaging device for reading the one-dimensional bar pattern coupled to the object and for producing a pattern image, a device for translating the pattern image into a sequence of bar widths and transition directions representing a detected code, a device for comparing the detected code with a predetermined code, and a device for indicating one of the detected code and acceptance or rejection of the detected code based on comparison of the detected code with the predetermined code.

With the invention, the advantages of hidden holographic bar codes, which offer the security of a hidden pattern and machine verification, and the increased difficulty of counterfeiting, are readily achieved.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
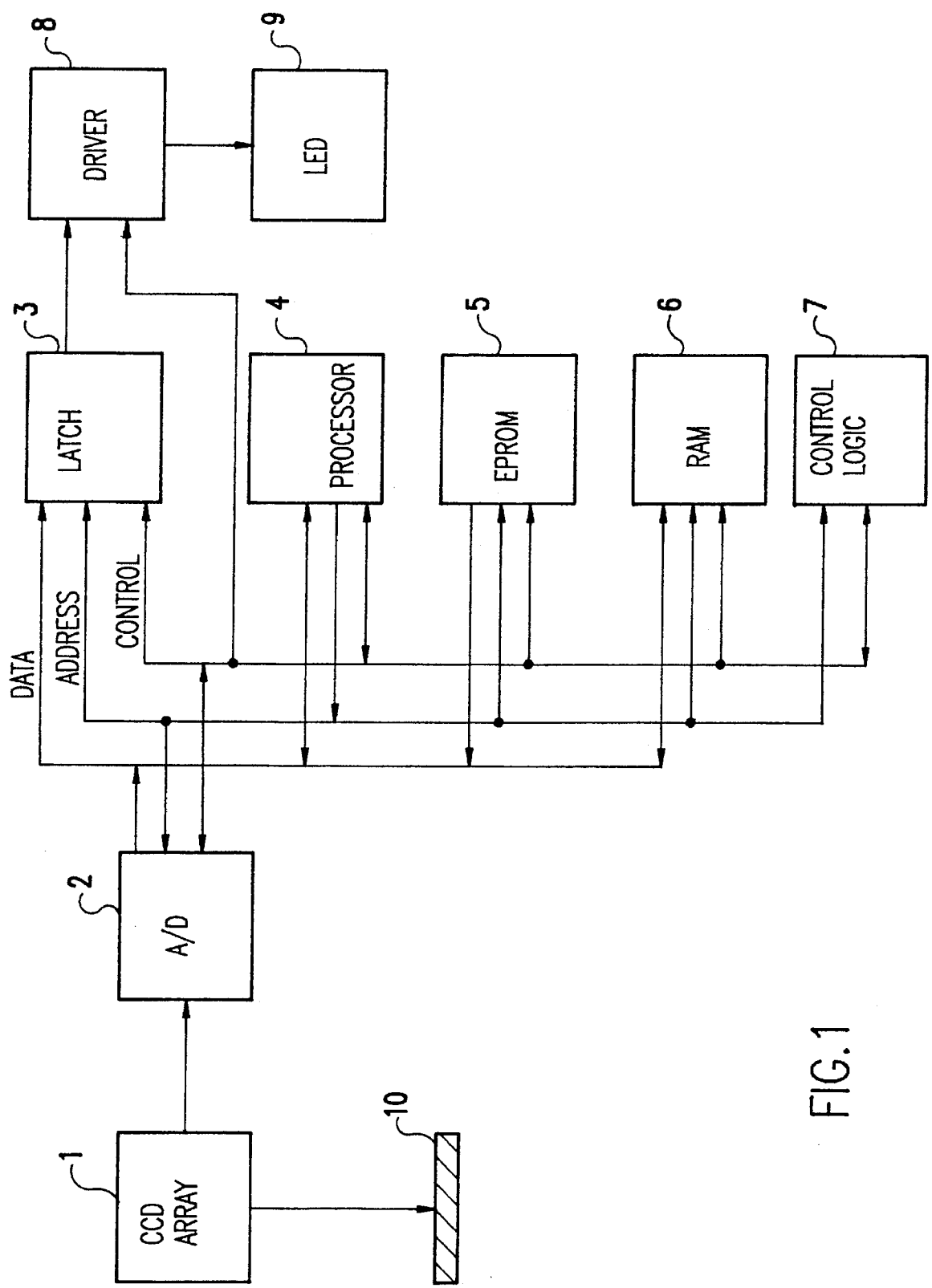
FIG. 1 illustrates a system according to the present invention for reading and verifying grayscale bar codes.

Referring now to the drawings, and more particularly to FIG. 1, there is shown a system for verification of a gray scale code according to the present invention.

The invention uses grayscale (e.g., non-binary) bar codes and a non-standard decoding algorithm to provide enhanced security for holograms or other authentication devices at very low cost.

As shown in FIG. 1, the device 1 according to the present invention includes a one-dimensional charge-coupled device (CCD) array 1 configured with illumination and imaging optics that form a high quality image of the bar code 10 on the CCD array. The bar code 10 is typically coupled to an animate or inanimate object of interest such as a credit or identification card, personnel or retail items.

The CCD array 1 preferably includes a plurality of regions (e.g., at least 1000 light-sensitive regions) arranged in a linear configuration, along with clock and drive circuitry. As is known, the greater the number of light-sensitive regions, the greater the resolution, and hence reliability, of the image produced by the CCD array. Such CCD arrays are commercially available from EG & G Reticon Corporation.

The array 1 also comprises off-the-shelf parts such as an imaging lens that magnifies or demagnifies the bar code to form an image having a size which fits within the actual length of the CCD sensor, an optical filter that blocks most light except that of a laser diode illuminator, and a laser diode coupled with beam shaping lenses and for hologram illumination, to thereby form a stripe of collimated light on the bar code.

The device also includes an analog/digital (A/D) converter 2, a latch 3, a processor 4 (e.g., a microprocessor or the like), an electrically programmable read-only memory (EPROM) 5 for storing a predetermined algorithm code(s) which have been previously coded according to information or data related to the object of interest, a random access memory (RAM) 6 for data and program storage, a control logic unit 7, a driver 8 and a display (e.g., a light-emitting diode) 9 functioning as a visual alarm. An auditory alarm may additionally or alternatively be provided.

With the invention, a device is provided which can verify a 30-bar code in less than one second.

Figure 2:
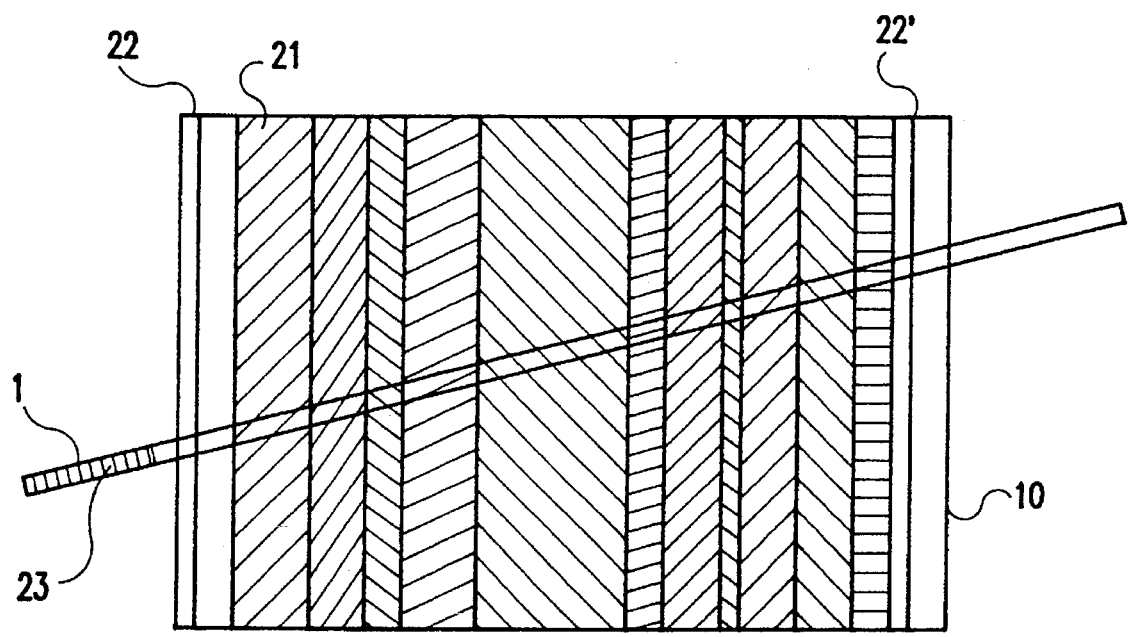
FIG. 2 illustrates an example of a grayscale barcode according to a first aspect of the invention and for use with the system shown in FIG. 1.

FIG. 2 illustrates an example of the grayscale barcode 10 shown in FIG. 1, as imaged onto the plane of the CCD sensor array 1. The gray scale pattern includes a predetermined pattern which includes vertical stripes of varying brightness and width 21.

In FIG. 2, the image of the barcode 10 is shown such that the pattern stripes are not accurately orthogonal to the long axis of the CCD array 1, to demonstrate that the orientation and position of the barcode with respect to the CCD are not critical. For illustrative purposes, a few individual light-sensitive pixels of the CCD array such as 23 are shown in FIG. 2.

In FIG. 2, each type of cross-hatching 21 represents a different brightness, or graylevel. At least one bar 22 of the predetermined pattern indicates a start of the pattern and at least one bar 22' indicates an end of the predetermined pattern. While FIG. 2 illustrates a left-to-right reading of the card (e.g., reading from the leftward start bar 22 to the rightward end bar 22'), it is obvious that the direction of reading (and thus the placement of bars) can be reversed according to the user's requirements.

Figure 3:
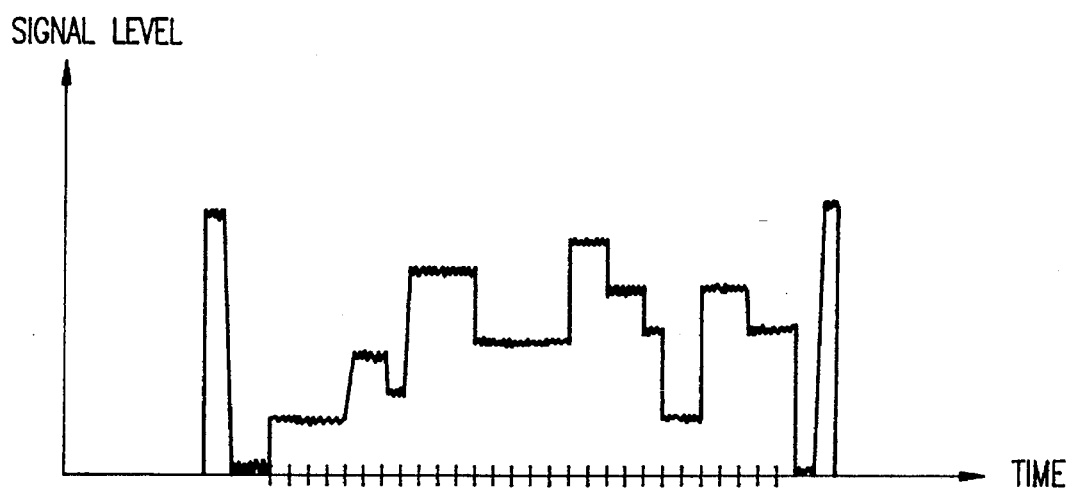
FIG. 3 illustrates an example of an output of a charge-coupled device (CCD) array of the system shown in FIG. 1 according to the present invention.

The output of the CCD array 1 shown in FIG. 1 is an analog signal with "noise" (e.g., interference, "crosstalk" etc.), such as that shown in FIG. 3, which illustrates the signal level as a function of time. The CCD 1 must be oriented with respect to the pattern image so that every bar in the pattern is imaged onto the CCD array 1. However, the CCD need not be precisely perpendicular to the pattern bars so as to be "readable".

The analog signal output of the CCD array 1 is processed and is input to the analog-to-digital (A/D) converter 2.

Figure 4:
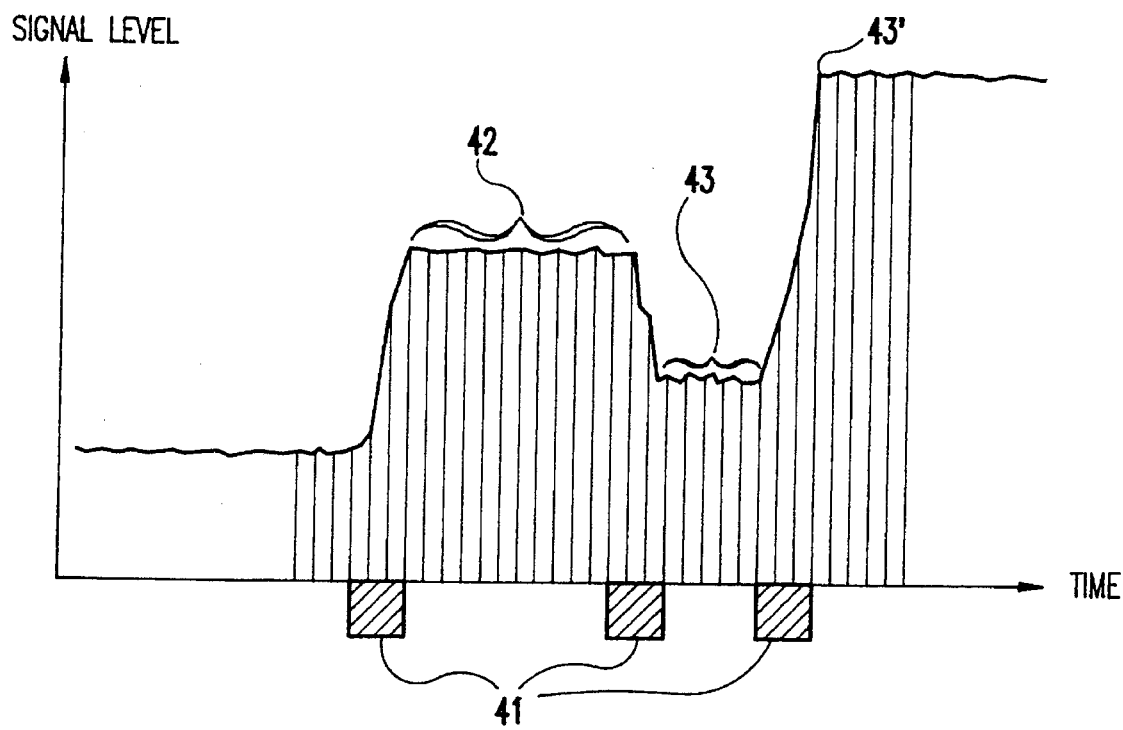
FIG. 4 illustrates an example of a portion of a smoothed signal output of the CCD array of the system shown in FIG. 1.

The first processing step is to take a running average, or to smooth the signal to reduce high frequency noise contained in the signal. FIG. 4 illustrates an expanded view of a section of the smoothed signal as a function of time and illustrates the input signal 41, a flat region 42 representing no transitions, and a "valley" 43 (and a peak 43' adjacent thereto) indicating a transition.

Figure 5:
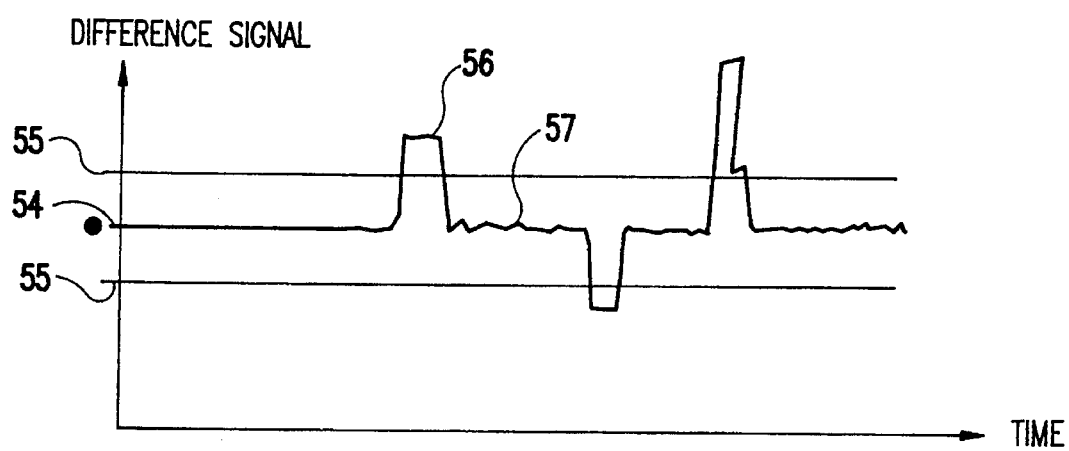
FIG. 5 illustrates a difference signal over time, the difference signal resulting from the processing of pixels in the image pattern.

The next processing step is to take differences between neighboring pixels (e.g., $I(x)-I(x-1)$ or $(I(x+1)+(I(x-1)-2*I(x))/2$, where $I(x)$ stands for the brightness measurement at the x-th pixel) resulting in a derivative-like signal as shown in FIG. 5.

As shown in FIG. 5, the difference signal is centered about the zero-level 54. An upper and lower threshold 55 are suitably applied to the difference to detect locations of peaks such as 56, as shown in FIG. 5, but to ignore noise 57. The detected peaks correspond to abrupt transitions in the input signal 41, as shown in FIG. 4.

The thresholds are preferably automatically determined during a one-time or occasional calibration procedure. During calibration, a reference barcode pattern with known numbers of bar transitions and known bar widths is scanned by the device. Thresholds are initially set at default levels (e.g., very high). The number of detected transitions is counted and compared with the known number of transitions. If the number of detected transitions is smaller than the known number, the thresholds are decreased incrementally until the expected number of transitions is detected. This threshold level L1 is recorded. The thresholds are again decreased incrementally until the number of detected transitions exceeds the known quantity, which occurs at level L2. A threshold level midway between L1 and L2 is then stored, completing the calibration procedure.

Similarly, if the number of transitions is larger than expected, the thresholds are increased incrementally. The detected bar widths are also compared with the known widths as a check on the success of the calibration procedure. The thresholds thus determined and stored in the reader device are then used in subsequent readings of unknown barcodes.

Alternatively, the operator can override the automatically determined thresholds to deal with unusual requirements or constraints.

The polarity of the difference signal indicates the direction of the transition (up or down) and is recorded. Processing can be performed in either analog or digital domains, as would be known by one of ordinary skill in the art within the purview of this application.

After the transitions have been found, the distance (in pixels) between transitions is measured.

For example, the width of the flat region 42 (as shown in FIG. 4) is measured by counting the number of pixels encompassing the flat region. When all the bar widths have been determined accordingly, they are normalized by division by a number proportional to the number of pixels between the start and end bars 22, 22' (or their derivative peaks).

The sequence of normalized bar widths and the direction of the transitions (up or down), can be used as elements of the grayscale bar code. For example, a section of code may be represented as 5-up-9-up-3-down-5-up-4-down or the like. The system either displays the detected code to the user on a display such as an LED, a cathode ray tube (CRT) or the like, or indicates, by a visual or audible alarm, the success or failure of the comparison of the detected code with a predetermined algorithm code stored in the EPROM (or other memory of the processor 4).

Turning back to FIG. 1, a description of the operation of the system is described hereinbelow.

First, upon being powered-on, the processor 4 automatically loads the gray scale barcode reader algorithm code from the EPROM 5 to a program memory location of the RAM 6. The processor runs the algorithm code at the program memory location of the RAM 6.

Thereafter, the A/D converter 2 digitizes the analog signal produced by the CCD array scanning of the barcode 10 attached to an object of interest and thereby produces a digital signal. The digital signal output from the output port of the A/D converter 2 is input to the processor 4 via the control of the control logic 7. The processor 4 stores the digital signal at the data memory location of the RAM 6 for the subsequent algorithmic calculation.

Once the calculation is completed, the processor 4 outputs the results to the latch 3 which latches the results indefinitely until a next result is read. Finally, the driver 8 amplifies the electrical (digital) signal of the latch results to ensure that the results can be displayed in visible form on the display (e.g., an LED) 9.

The use of grayscale bar codes differs from standard practice, which uses binary patterns. The primary problem with grayscale coding is dependence on accurate generation and detection of graylevels in the signal.

However, the inventive structure using the inventive method and configuration removes dependence on grayscale accuracy. Instead, the invention primarily relies on distinct transitions between gray scales at the edges of the bars, such transitions being easily detectable and comparable to a predetermined code. Thus, the grayscale code retains the simplicity of one-dimensional scanning used in standard bar code readers, but increases the difficulty of reproducing or counterfeiting the pattern in two ways.

First, creating grayscale patterns is inherently more complex than standard binary bar codes since the variables (e.g., the grayscale patterns) are much more numerous and complex. Thus, the counterfeiter will experience problems in attempting to reproduce the grayscale patterns.

Secondly, the important parameters (width and transition direction) of the patterns are not obvious to the observer. Thus, counterfeiting is made much more difficult than in the conventional methods and arrangements.

Thus, with the invention, a unique and unobvious pattern code and verification system is provided which includes a grayscale one-dimensional bar pattern, an illumination and imaging system using a one-dimensional imaging device, a processing scheme that translates and interprets the pattern image into a sequence of bar widths and transition directions, a display that displays either the detected code or acceptance/rejection of the detected code.

As mentioned above, the invention is readily implemented with off-the-shelf parts, such as simple optics, a laser diode (for hologram illumination), a linear CCD scanner, an analog/digital converter and suitable processing circuitry, and a microprocessor. The system verifies a 30-bar code in less than one second.

With the invention, the advantages of hidden holographic bar codes, which offer the security of a hidden pattern and machine verification, and the increased difficulty of counterfeiting are readily achieved.

An additional advantage of the invention is its relatively low cost compared to other security devices.

While several uses of the invention are described above, the above uses are not limiting and the invention could clearly be used in a variety of different applications. Further, while the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for verifying an object of interest, comprising:
   a grayscale, one-dimensional bar pattern coupled to said object;
   an illumination and imaging system including a one-dimensional imaging device for reading said pattern coupled to said object and for producing a pattern image;
   means for translating the pattern image into a sequence of bar widths and transition directions representing a detected code;
   means for comparing the detected code with a predetermined code; and
   means for indicating one of the detected code, acceptance, and rejection of the detected code based on comparison of said detected code with said predetermined code.

2. A system according to claim 1, wherein said illumination and imaging system includes a one-dimensional charge-coupled device array.

3. A system according to claim 1, wherein said means for translating includes averaging means for taking a running average of an output from said illumination and imaging system, to thereby produce a first signal.

4. A system according to claim 3, wherein said means for translating further includes difference calculating means, coupled to said averaging means, for calculating a difference in brightness between neighboring pixels of each of a plurality of pixels forming said image to produce second signals, said second signals being difference signals.

5. A system according to claim 4, wherein said means for translating further includes means, coupled to said difference calculating means, for respectively determining polarities of said difference signals.

6. A system according to claim 5, wherein said means for translating further includes means, coupled to said determining means, for calculating a distance between transitions of said polarities of said difference signals and for calculating a width between all of a plurality of bars forming said bar pattern.

7. A system according to claim 6, wherein said means for translating further includes means, coupled to said calculating means, for normalizing said widths by division by a number proportional to a number of pixels between a first bar of a plurality of bars of said bar pattern and a second bar of said plurality of bars of said bar pattern.

8. A system according to claim 4, wherein said means for translating further includes means for determining first and second threshold signals for application to each of said difference signals to detect locations of peaks corresponding to transitions in said output from said illumination and imaging system.

9. A system according to claim 8, wherein said means for determining automatically determine said threshold signals such that said threshold signal have predetermined thresholds.

10. A system according to claim 1, wherein said bar pattern comprises a one of a binary bar pattern and a nonbinary bar pattern having a predetermined pattern having a plurality of stripes of varying brightness and width.

11. A system according to claim 10, wherein said bar pattern includes at least one bar which represents a start of the pattern and at least one bar which represents an end of the pattern.

12. An apparatus for verifying an object of interest having a grayscale one-dimensional bar pattern coupled thereto, comprising:

an illumination and imaging system using a one-dimensional imaging device for reading said one-dimensional bar pattern coupled to said object and for producing a pattern image;

means for translating the pattern image into a sequence of bar widths and transition directions representing a detected code;

means for comparing the detected code with a predetermined code; and means for indicating one of the detected code, acceptance, and rejection of the detected code based on comparison of said detected code with said predetermined code.

13. An apparatus according to claim 12, wherein said illumination and imaging system includes a one-dimensional charge-coupled device array.

14. An apparatus according to claim 12, wherein said means for translating includes averaging means for taking a running average of an output from said illumination and imaging system, to thereby produce a first signal.

15. An apparatus according to claim 14, wherein said means for translating further includes difference calculating means, coupled to said averaging means, for calculating a difference in brightness between neighboring pixels of each of a plurality of pixels forming said image to produce second signals, said second signals being difference signals.

16. An apparatus according to claim 15, wherein said means for translating further includes means, coupled to said difference calculating means, for respectively determining polarities of said difference signals.

17. An apparatus according to claim 16, wherein said means for translating further includes means, coupled to said determining means, for calculating a distance between transitions of said polarities of said difference signals and for calculating a width between all of a plurality of bars forming said bar pattern.

18. An apparatus according to claim 17, wherein said means for translating further includes means, coupled to said calculating means, for normalizing said widths by division by a number proportional to a number of pixels between a first bar of a plurality of bars of said bar pattern and a second bar of said plurality of bars of said bar pattern.

19. An apparatus according to claim 15, wherein said means for translating further includes means for determining first and second threshold signals for application to each of said difference signals to detect locations of peaks corresponding to transitions in said output from said illumination and imaging system.

20. An apparatus according to claim 19, wherein said means for determining automatically determine said threshold signals such that said threshold signal have predetermined thresholds.

* * * * *